(12) United States Patent
Li et al.

(10) Patent No.: US 12,199,486 B2
(45) Date of Patent: Jan. 14, 2025

(54) STATOR, FAN, AND CLEANING DEVICE

(71) Applicant: Beijing Roborock Technology Co., Ltd., Beijing (CN)

(72) Inventors: Changcheng Li, Beijing (CN); Xing Li, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 0 days.

(21) Appl. No.: 18/022,198

(22) PCT Filed: Sep. 3, 2021

(86) PCT No.: PCT/CN2021/116434
§ 371 (c)(1),
(2) Date: Feb. 20, 2023

(87) PCT Pub. No.: WO2022/052873
PCT Pub. Date: Mar. 17, 2022

(65) Prior Publication Data
US 2023/0307978 A1    Sep. 28, 2023

(30) Foreign Application Priority Data
Sep. 14, 2020   (CN) .......................... 202010963271.2

(51) Int. Cl.
*H02K 3/52*        (2006.01)
*A47L 9/00*        (2006.01)
(Continued)

(52) U.S. Cl.
CPC ............ *H02K 3/522* (2013.01); *A47L 9/0081* (2013.01); *A47L 9/22* (2013.01); *F04D 17/08* (2013.01);
(Continued)

(58) Field of Classification Search
CPC ................ F04D 25/0693; H02K 3/521; H02K 5/1735; H02K 21/20
See application file for complete search history.

(56) References Cited

U.S. PATENT DOCUMENTS

| 8,636,479 B2 | 1/2014 | Kenyon et al. | |
| 2018/0219436 A1* | 8/2018 | Shiozawa | H02K 1/146 |

(Continued)

FOREIGN PATENT DOCUMENTS

| CN | 102204062 A | 9/2011 |
| CN | 107947398 A | 4/2018 |

(Continued)

OTHER PUBLICATIONS

International Search Report from PCT/CN2021/116434 dated Nov. 9, 2021.
(Continued)

*Primary Examiner* — Courtney D Heinle
*Assistant Examiner* — Danielle M. Christensen
(74) *Attorney, Agent, or Firm* — Calfee, Halter & Griswold LLP

(57) ABSTRACT

Disclosed are a stator and a fan. The stator comprises: an annular stator outer ring. A plurality of stator teeth which are uniformly distributed are connected in the circumferential direction of the inner side of the stator outer ring; the stator teeth are provided along the radial direction of the stator outer ring; a winding group coil is wound outside each stator tooth; the depths of first lead grooves of the insulating wire frames corresponding to the winding group coils in the same phase are the same, and depths of first lead grooves of the insulating wire frames corresponding to the winding group coils of different phases are different from each other, so that in the circumferential direction of the stator outer ring, the wires of different phases are staggered in height, and thus the wires of the phases of the stator are arranged in order.

16 Claims, 10 Drawing Sheets

(51) Int. Cl.
*A47L 9/22* (2006.01)
*F04D 17/08* (2006.01)
*F04D 29/28* (2006.01)
*F04D 29/44* (2006.01)
*H02K 11/33* (2016.01)
*H02K 21/20* (2006.01)

(52) U.S. Cl.
CPC ......... *F04D 29/281* (2013.01); *F04D 29/444* (2013.01); *H02K 11/33* (2016.01); *H02K 21/20* (2013.01); *H02K 2203/06* (2013.01); *H02K 2203/12* (2013.01); *H02K 2211/03* (2013.01)

(56) References Cited

U.S. PATENT DOCUMENTS

| | | | |
|---|---|---|---|
| 2021/0257873 A1* | 8/2021 | Amaya | H02K 1/148 |
| 2023/0140359 A1* | 5/2023 | Han | H02K 1/27 15/412 |

FOREIGN PATENT DOCUMENTS

| | | | |
|---|---|---|---|
| CN | 207753516 U | | 8/2018 |
| CN | 209984154 U | | 1/2020 |
| CN | 212543466 U | | 2/2021 |
| DE | 102017209931 A1 | * | 12/2018 |
| DE | 102019200155 A1 | | 7/2020 |
| JP | 2000232745 A | | 8/2000 |
| JP | 2009240119 A | | 10/2009 |
| JP | 2013211956 A | | 10/2013 |
| JP | 2014128049 A | | 7/2014 |
| JP | 2017163726 A | | 9/2017 |
| JP | 2017189065 A | | 10/2017 |
| JP | 2018166399 A | | 10/2018 |
| WO | 2020062479 A1 | | 4/2020 |

OTHER PUBLICATIONS

Office action from Japanese Application No. 2022-560953 dated Nov. 7, 2023.
Office Action from Chinese Application No. 2020010963271.2 dated Oct. 28, 2024.
Extended European Search Report from European Application No. 21865927.4 dated Sep. 30, 2024.

* cited by examiner

STATOR, FAN, AND CLEANING DEVICE

CROSS-REFERENCE TO RELATED APPLICATION

This application is the national stage entry of PCT International Application No. PCT/CN2021/116434, filed on Sep. 3, 2021, which claims priority to the Chinese Patent Application No. 202010963271.2, filed on Sep. 14, 2020, which are incorporated herein by reference in their entireties.

TECHNICAL FIELD

The present disclosure relates to the field of mechanical design technologies, and in particular relates to a stator, a fan, and a cleaning device.

BACKGROUND

A fan, as a machine that increases the pressure of gas depending on input mechanical energy and discharges gas, is a driven fluid machine. The fan is a customary abbreviation of a gas compression and gas delivery machine in China, and is commonly referred to as a ventilator, a blower and a wind turbine.

Fans are mainly used for ventilation in various fields of national economy, such as metallurgy, petrochemical industry, electric power, urban rail transit, textiles and ships, and in various places. In addition to the traditional application fields, the fans will still have great development prospects in more than 20 potential market fields, such as comprehensive utilization of coal gangue, technological transformation of new dry clinker, and energy saving and comprehensive utilization of resources in metallurgical industry.

SUMMARY

According to a first aspect of the present disclosure, a stator is provided. The stator includes an annular stator outer periphery, wherein a plurality of uniformly distributed stator teeth are connected to the inner side of the stator outer periphery in the circumferential direction; the stator teeth are arranged in the radial direction of the stator outer periphery; each winding group coil is correspondingly provided with an insulating wire frame, and each of the insulating wire frames is provided along an axial direction of the stator outer periphery; the insulating wire frame is provided with a first lead groove, and the first lead groove is configured to lead out one end of the winding group coil to enable it to be connected to the winding group coil of the same phase around the outside of the stator outer periphery in the circumferential direction; and the depths of the first lead grooves of the insulating wire frames corresponding to the winding group coils of the same phase are the same, and the depths of the first lead grooves of the insulating wire frames corresponding to the winding group coils of different phases are different from each other.

In some embodiments, a span of the stator is 1.

In some embodiments, the number of stator teeth is an even number.

Further, the stator outer periphery is formed in a surrounding manner by a plurality of ring-sector-shaped stator units that are chain-connected; each of the stator units is connected to the stator tooth; and each of the insulating wire frames is arranged on the stator unit.

Further, the stator outer periphery is formed by: after the winding group coil is formed upon winding the stator teeth and one end of the winding group coil is led out by the insulating wire frame, extends around the outside of the stator outer periphery in the circumferential direction and is connected to the winding group coil of the same phase, connecting the stator unit in the first place to the stator unit in the last place and welding connection wires of all the adjacent stator units.

Further, one end of the stator tooth distal from the stator outer periphery is recessed to form a circular arc structure; a circle formed in a surrounding manner by the circular arc structures of the stator teeth is configured to accommodate a rotor having two poles; the number of the stator teeth is 6; and the stator is of three phases.

Further, the stator outer periphery sequentially includes a first winding group coil, a second winding group coil, a third winding group coil, a fourth winding group coil, a fifth winding group coil and a sixth winding group coil in the circumferential direction, wherein a first end of the first winding group coil is connected to one end of the fourth winding group coil to form a first phase of the stator, a first end of the second winding group coil is connected to one end of the fifth winding group coil to form a second phase of the stator, and a first end of the third winding group coil is connected to one end of the sixth winding group coil to form a third phase of the stator, such that an angle between two of the winding group coils of the same phase is 180°.

Further, the wire clamping portion is arranged on the side, distal from the stator teeth, of a sixth insulating wire frame corresponding to the sixth winding group coil; and the sixth insulating wire frame includes a second lead groove, and the second lead groove is configured to lead an outgoing end of each phase to the wire clamping portion.

Further, each of the insulating wire frames corresponding to the first winding group coil, the third winding group coil and the fifth winding group coil is provided with a third lead groove, and the third lead groove is configured to lead an outgoing end of each phase; and the outgoing end of each phase is connected to a circuit board by a lead.

Further, the six winding group coils are connected by means of Y connection or delta connection to form three phases of the stator.

Further, the number of branches of the winding group coils of the same phase is 1.

Further, the number of parallel branches in the winding group coils of the same phase is 2.

Further, a yoke of the stator is provided with a semi-circular hole for positioning an axial diffuser of a fan; and the semi-circular hole is provided on a center line of the stator tooth.

Further, a connecting post matched with a connecting hole of the axial diffuser is arranged on the side of the stator outer periphery proximal to the axial diffuser, and the connecting post is configured to assemble the axial diffuser.

According to another aspect of the present disclosure, a fan is further provided. The fan includes a rotor and the stator provided by the foregoing embodiments, wherein the rotor is a permanent magnet having two poles.

Further, the fan further includes a circuit board, wherein an outgoing end of each phase of the stator is connected to the circuit board by a lead.

Further, the fan further includes: an axial diffuser, an air hood, and an impeller, wherein the axial diffuser is fixedly connected to the stator, and includes an outer cylinder, a main body arranged in the outer cylinder, and diffuser vanes connected to the outer cylinder and the main body, the diffuser vanes divide an annular space between the outer cylinder and the main body into a plurality of diffusion air passages; the main body is provided with a central shaft hole; the air hood is fixedly connected to the axial diffuser; an impeller chamber and an annular gridless channel surrounding the impeller chamber are formed between the air hood and the axial diffuser; the impeller chamber and the diffusion air passage are communicated by the annular gridless channel; the air hood is provided with an air inlet; the impeller is arranged in the impeller chamber, and is configured to introduce air from the air inlet; and driven by the impeller, air enters the diffusion air passage through the annular gridless channel, and flows out from the other end of the diffusion air passage.

According to a third aspect of the present disclosure, a cleaning device is provided and includes the fan provided in the second aspect.

BRIEF DESCRIPTION OF THE DRAWINGS

FIG. 1b is a side view of the stator shown in FIG. 1a;

REFERENCE NUMBERS IN THE DRAWINGS ARE DESCRIBED AS BELOW

1—stator; 11—stator outer periphery; 111—stator unit; 1111—insulating wire frame; 112—semi-circular hole; 113—connecting post; 12—stator tooth; 121—circular arc structure; 13—winding group coil; 13A—lead; 13B—wiring end of winding group coil; 131—first coil; 132—second coil; 133—third coil; 134—fourth coil; 135—fifth coil; 136—sixth coil; 14—stator groove; 141—opening of stator groove; 15—wire clamping portion; 16—jumper; 2—rotor; 3—axial diffuser; 31—outer cylinder; 32—main body; 33—diffuser vane; 34—diffusion air passage; 35—central shaft hole; 36—positioning post; 37—connecting hole; 4—air hood; 41—air inlet; 42—second annular protrusion; 5—impeller; 6—bearing; 7—circuit board; 8—annular gridless channel; 9—impeller chamber; and 10—motor shaft.

DETAILED DESCRIPTION

In order to make the objectives, technical solutions and advantages of the present disclosure clearer, the present disclosure will be further described in detail below in conjunction with the specific embodiments and with reference to the accompanying drawings. It should be understood that these descriptions are exemplary only, and are not intended to limit the scope of the present disclosure. In addition, in the following description, descriptions of common structures and technologies are omitted to avoid unnecessarily obscuring the concepts of the present disclosure.

Schematic diagrams of layer structures according to the embodiments of the present disclosure are shown in the accompanying drawings. These figures are not drawn to scale, in which, for the purpose of clarity, some details are exaggerated, and some details are probably omitted. The shapes of various regions and layers shown in the figures, as well as their relative sizes and positional relationships, are merely exemplary, and may vary in practice due to manufacturing tolerances or technical limitations, and those skilled in the art can additionally design regions/layers of different shapes, sizes and relative positions as required.

Obviously, the described embodiments are some, but not all, embodiments of the present disclosure. Based on the embodiments in the present disclosure, all other embodiments obtained by those of ordinary skill in the art without creative efforts shall fall within the protection scope of the present disclosure.

In the descriptions of the present disclosure, it should be noted that the terms "first", "second" and "third" are only used for descriptive purposes, and cannot be construed as indicating or implying relative importance.

In addition, the technical features involved in different embodiments of the present disclosure described below can be combined with each other as long as they do not conflict.

Figure 1A:
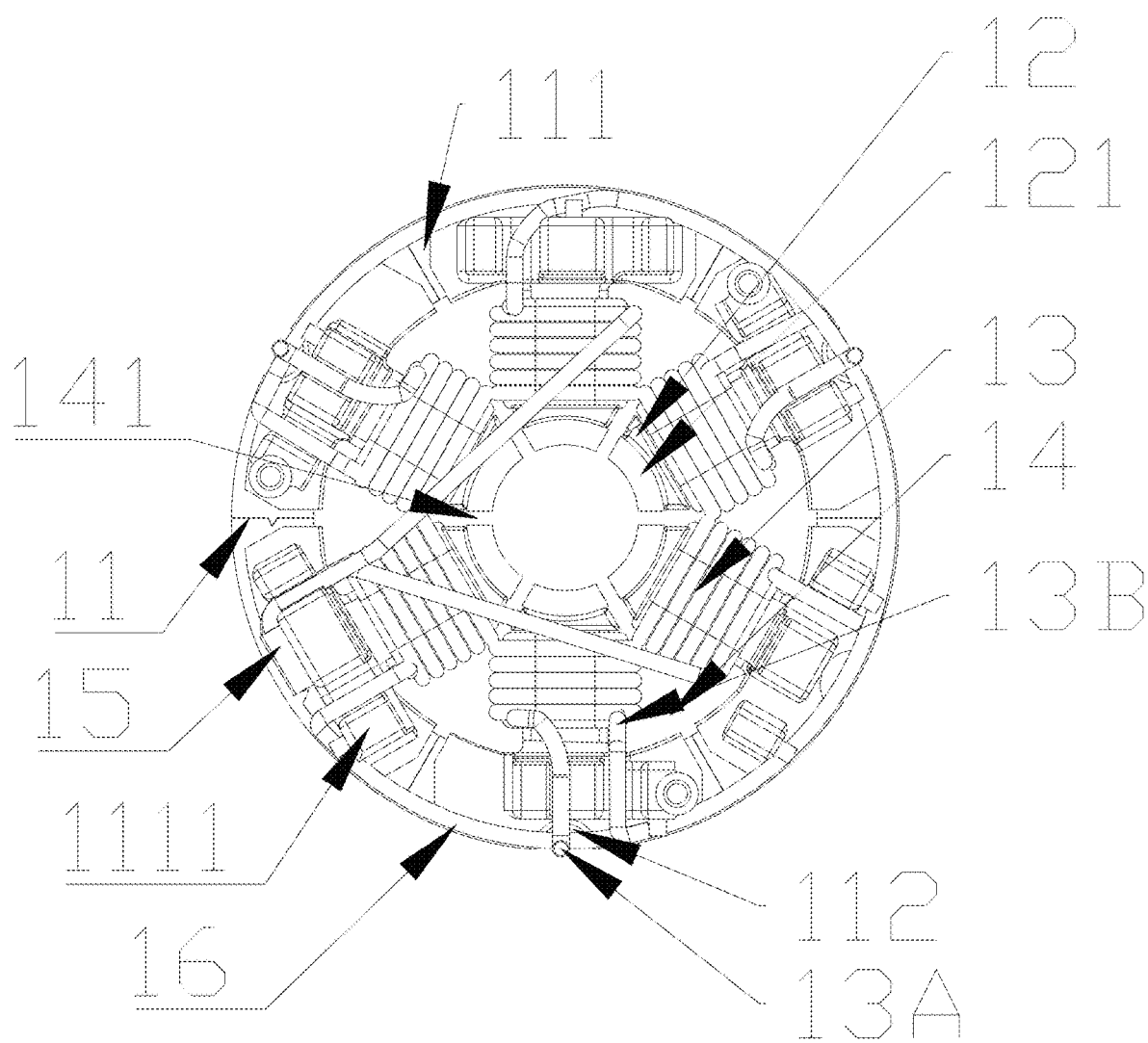
FIG. 1a is a schematic structural diagram of a stator according to an embodiment of the present disclosure.
Figure 1B:
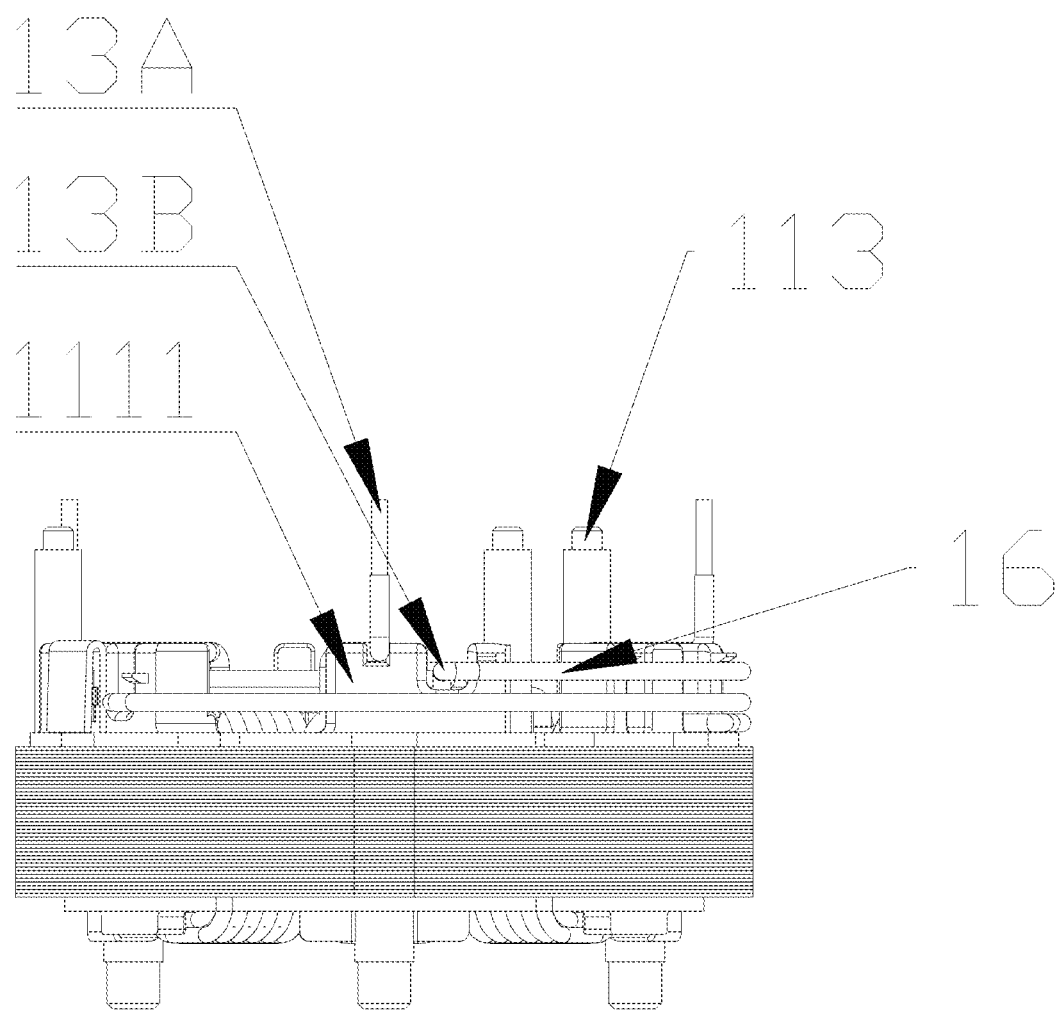
Figure 1C:
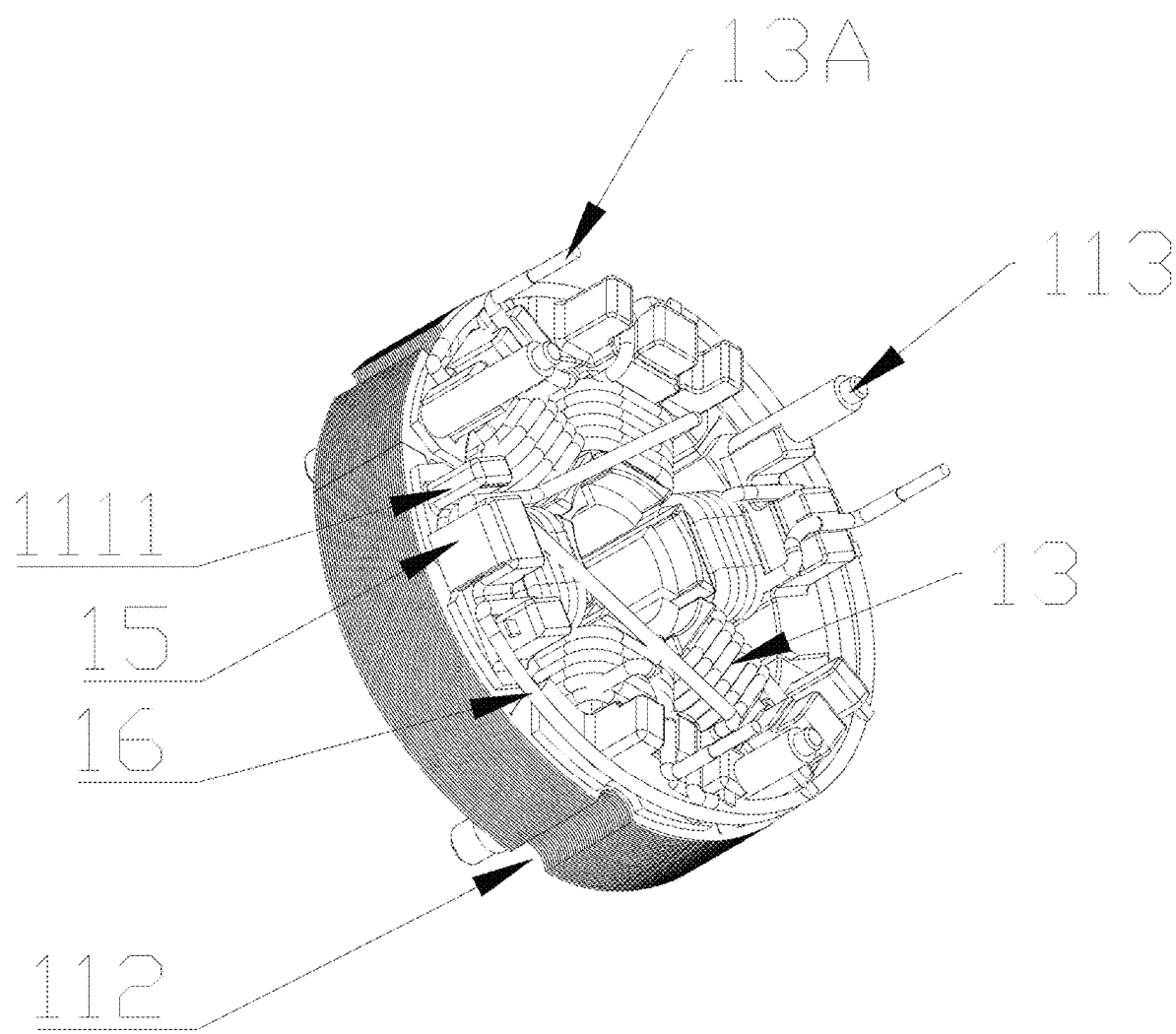
FIG. 1c is a perspective view of the stator shown in FIG. 1b.

FIG. 1a is a schematic structural diagram of a stator according to an embodiment of the present disclosure. FIG. 1b is a side view of the stator shown in FIG. 1a. FIG. 1c is a perspective view of the stator shown in FIG. 1b.

As shown in FIGS. 1a to 1c, the stator 1 includes an annular stator outer periphery 11, stator teeth 12 and winding group coils 13 sleeving the stator teeth 12.

A plurality of stator teeth distributed uniformly is connected to the inner side of the stator outer periphery 11 in the circumferential direction.

The stator teeth 12 are provided along the radial direction of the stator outer periphery 11, and the winding group coil sleeves each of the stator teeth.

Each winding group coil 13 is correspondingly provided with one insulating wire frame 1111, and each insulating wire frame 1111 is provided along the axial direction of the stator outer periphery 11.

The insulating wire frame 1111 is provided with a first lead groove. The first lead groove is configured to lead out one end of the winding group coil to enable it to be connected to the winding group coil of the same phase around the outside of the stator outer periphery 11 in the circumferential direction.

The depths of the first lead grooves of the insulating wire frames 1111 corresponding to the winding group coils of the same phase are the same, and the depths of the first lead grooves of the insulating wire frames 1111 corresponding to the winding group coils of different phases are different, such that lines of different phases are staggered in a height direction outside the stator outer periphery 11 in the circumferential direction. In this way, the lines of all phases of the stator may be arranged in order, and the stator is prevented from the risk of conduction caused by interlacing, and hence is prolonged in service life and improved in security.

One winding group coils 13 only sleeves one stator tooth 12. In other words, in the present disclosure, the span of the winding group coils is 1. Since the span of the winding group coils is 1, the production efficiency can be improved. Since the coil is tied to one tooth, the rigidity of both the coil and an iron core can be improved, and the noise can be reduced.

It can be understood that in some prior art, when a stator is assembled with a coil of which the span is greater than 1, it is necessary to prepare a winding group coil according to a predetermined number of turns, and then embed the winding group coil into a stator groove, instead of directly sleeving the stator teeth by the coil. For example, with regard to a coil with a span of 2, two stator grooves are spanned between two ends of the coil. Generally, a rotor of a motor is a magnet having two poles and is located in a stator outer periphery, and the rotor is of a columnar structure, with the S pole and the N pole being semi-cylindrical. After analysis, the magnetic field direction of the rotor of the motor is in the circumferential direction of the stator outer periphery, i.e., the winding group coil in the axial direction of the stator outer periphery is active, while the winding group coil perpendicular to the axial direction of the stator outer periphery is inactive. Therefore, the coil with a span greater than 1 strides over many stator grooves because the coil perpendicular to the axial direction is relatively long, which may cause relatively long inactive copper wires, resulting in waste of the copper wires, high resistance, high copper loss, and relatively low efficiency.

After a great deal of research, it is determined that although a winding group coil with a span of 1 has a low winding coefficient (i.e., a torque output by the coil at the same current is relatively small), since the span is 1, i.e., one winding group coil is only wound around one stator tooth, the winding group coil may have short inactive copper wires, the copper wires are low in copper loss, and the efficiency is high. Although the coil with the span greater than 1 has a high winding coefficient, long inactive copper wires, high resistance and high copper loss may be caused because it is necessary to stride over multiple stator teeth and stator grooves, and the high copper loss may lead to little difference between the rotating efficiency of the stator and the efficiency of the coil with the span of 1 according to the present disclosure. However, according to the present disclosure, since the span of the coil is 1, the use of connection wires is reduced, the consumption of copper is low, and the coil can be tied to the stator teeth to improve the rigidity of the stator teeth. In this way, the production efficiency and the use efficiency of the stator are both improved.

In an embodiment, the number of the stator teeth of the stator is an even number.

In this embodiment, the stator outer periphery is connected to an even number of stator teeth distributed uniformly, and the number of the stator grooves equals the number of the stator teeth, i.e., there are also an even number of stator grooves, such that an unbalanced radial magnetic pull caused when the stator rotates, electromagnetic vibration and noise of the motor in use can be reduced.

Figure 2A:
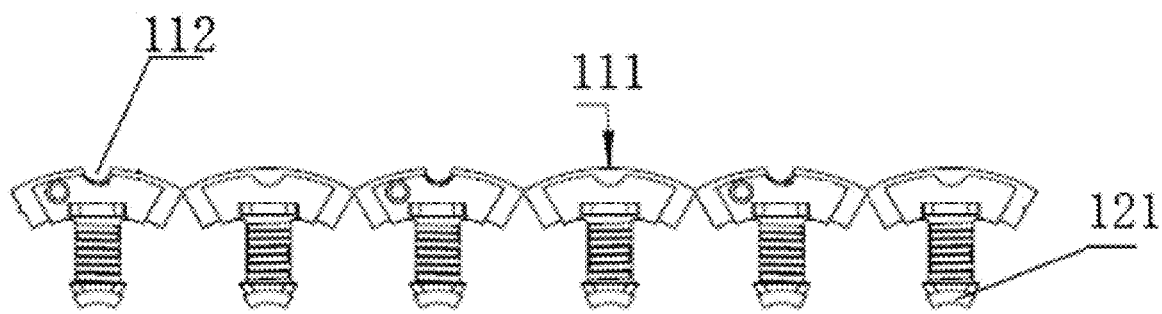
FIG. 2a is a schematic structural diagram of a chain-connected stator unit according to an embodiment of the present disclosure.

FIG. 2a is a schematic structural diagram of a chain-connected stator unit according to an embodiment of the present disclosure.

As shown in FIG. 2a, the stator outer periphery is formed in a surrounding manner by a plurality of ring-sector-shaped stator units 111 that are chain-connected. Each stator unit 111 is connected to the stator tooth, and each of the insulating wire frames 1111 is arranged on the stator unit 111.

In this embodiment, the stator unit is made from a high-frequency silicon steel material, and the stator outer periphery is formed in a surrounding manner by a plurality of ring-sector-shaped stator units that are chain-connected, such that during machining of the stator outer periphery, two chained stator outer peripheries can cross each other, i.e., stator teeth of a second stator outer periphery are arranged between two stator teeth of a first stator outer periphery. Therefore, two stator outer peripheries can be produced by one time of die stamping, and the two stator outer peripheries are staggered, which, compared with production of one stator outer periphery by one time of stamping, greatly reduces silicon steel sheet consumption. In addition, in this embodiment, lines may be directly wound around each stator tooth since the stator outer peripheries are chain-connected, such that lines are wound around all the stator teeth at the same time, which improves the production efficiency, omits an installation process of embedding the coils in the stator grooves, and improves the production efficiency of the stator. Moreover, the stator outer periphery provided by the embodiment of the present disclosure may also enable the coils to firmly wrap around the stator teeth in order, which improves the rigidity of the stator teeth, and plays a role of protecting the stator teeth. Besides, the close coils may also be reduced.

In addition, it is worth mentioning that in the prior art, the winding group coil is embedded into the stator groove, and then a winding is secured at the stator groove, such that only more windings can be provided in order to increase the copper space factor of the stator groove. Compared with filling the stator grooves with the coils, the present disclosure has the advantage that since the lines are directly wound around the stator teeth to acquire the close windings, fewer copper wires are required while the same copper groove fill factor is achieved.

Figure 2B:
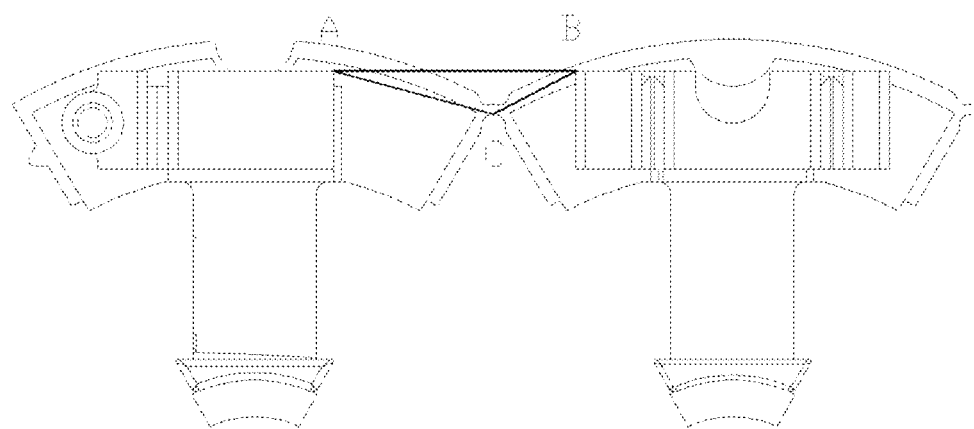
FIG. 2b is a partial schematic diagram of a chain-connected stator unit according to an embodiment of the present disclosure.
Figure 2C:
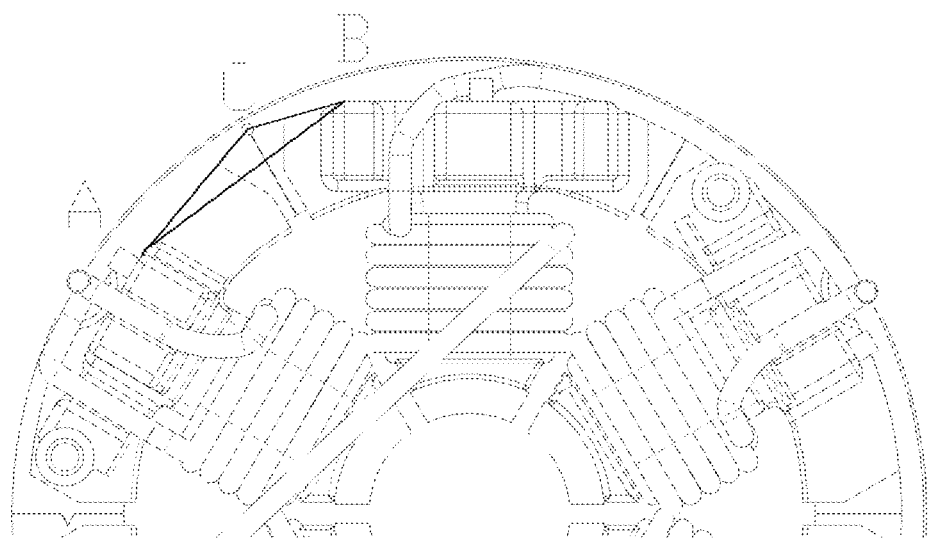
FIG. 2c is a schematic diagram of a stator formed in a surrounding manner by a plurality of stator units according to an embodiment of the present disclosure.

FIG. 2b is a partial schematic diagram of a chain-connected stator unit according to an embodiment of the present disclosure. FIG. 2c is a schematic diagram of a stator formed in a surrounding manner by a plurality of stator units according to an embodiment of the present disclosure.

As shown in FIGS. 2b and 2c, in this embodiment, the stator outer periphery 11 is formed by: after the winding group coil 13 is formed upon winding the stator teeth 12 and one end of the winding group coil is led out by the insulating wire frame 1111, extends around the outside of the stator outer periphery 11 in the circumferential direction and is connected to the winding group coil of the same phase, connecting the stator unit in the first place to the stator unit in the last place and welding connection wires of all the adjacent stator units.

In some embodiments, the connection wires of the adjacent stator units are welded.

In this embodiment, when the stator outer periphery is of a chain structure, winding of the stator teeth and connection of lines of the same phase are completed first, and then the chain-connected stator units are welded. Since outgoing lines of one ends of the first stator unit and the fourth stator unit that are chained are linearly connected in the length direction of the chain of the stator units, after the stator outer periphery is formed, the first stator unit and the fourth stator unit may be arranged along the arc of the stator outer periphery outside the stator outer periphery in the circumferential direction, such that the connection wires of the same phase can be tightened to be prevented from being loose, and hence noise of the stator is reduced.

In other words, in FIGS. 2b and 2c, point A is one end of the insulating wire frame 1111 of the previous stator unit, point B is one end of the insulating wire frame of the next stator unit near point A, and point C is a welding point.

The connection wires may directly run from point A to point B before the stator outer periphery is formed in a surrounding manner, and the connection wires from point A to point B may be clung to the arc at the periphery of the stator after the stator outer periphery is formed in a surrounding manner by the stator units. In this way, the connection wires may be tightened to be prevented from being loose.

In some embodiments, one end of the stator tooth distal from the stator outer periphery is recessed to form a circular arc structure 121. The circular arc structures of every two adjacent stator teeth are not connected, such that every two adjacent stator teeth and the stator outer periphery form a stator groove 14, and the circular arc structures 121 of every two adjacent stator teeth are kept a predetermined distance away from each other in the circumferential direction, and the space of the two circular arc structures in the circumferential direction is a groove opening 141 of the stator groove.

In an embodiment, a circle formed in a surrounding manner by the circular arc structures 121 of the stator teeth is configured to accommodate the rotor 2 having two poles.

There are six stator teeth and six stator grooves.

The stator is of three phases, i.e., each phase is provided with two winding group coils. The number of parallel branches of the two winding group coils is 1 or 2, i.e., the two winding group coils may be connected in series or in parallel.

In some embodiments, when there are six stator teeth and the stator is of three phases, the two coils of the same phase may form an angle of 180°.

In an embodiment, the stator further includes a jumper 16. After being led out through the first lead groove of the insulating wire frame 1111, both ends of the two winding group coils of the same phase may be connected to the two outgoing ends of the winding group coils respectively through the jumpers 16, such that the two coils form one phase line.

In some embodiments, the insulating wire frame 1111 may be integrally formed on the stator unit 111, or detachably arranged on the stator unit 111 (in the stator unit shown in FIG. 2, the insulating wire frame 1111 is not shown). For example, the insulating wire frame may be glued to the stator unit 111, or fastened to the stator unit by a fastener such as a screw or a nail.

In an embodiment, the insulating wire frame 1111 may include a base and three protrusions arranged on the base, wherein the three protrusions are of the same height and spaced apart in a line to form a first lead groove and a second lead groove. The first lead groove is configured to lead out one end of the winding group coil to enable it to be connected to the winding group coil of the same phase around the outside of the stator outer periphery 11 in the circumferential direction.

In another embodiment, the insulating wire frame 1111 may be a cuboid component, which is etched in the length direction to form two lead grooves.

In some embodiments, the depths of the two lead grooves may be the same or different, and the widths of the two lead grooves may also be the same or different.

In an embodiment, the outgoing ends of the three phases are connected to the circuit board of the fan by the leads 13A.

In an embodiment, the stator outer periphery 11 sequentially includes a first winding group coil, a second winding group coil, a third winding group coil, a fourth winding group coil, a fifth winding group coil and a sixth winding group coil in the circumferential direction, wherein a first end of the first winding group coil is connected to one end of the fourth winding group coil to form a first phase of the stator; a first end of the second winding group coil is connected to one end of the fifth winding group coil to form a second phase of the stator; and a first end of the third winding group coil is connected to one end of the sixth winding group coil to form a third phase of the stator, such that an angle between two of the winding group coils of the same phase is 180°.

In an embodiment, the stator further includes a wire clamping portion. The wire clamping portion is arranged on the side, distal from the stator teeth 12, of a sixth insulating wire frame corresponding to the sixth winding group coil, and the sixth insulating wire frame includes a second lead groove, and the second lead groove is configured to lead an outgoing end of each phase to the wire clamping portion. Furthermore, the wire clamping portion may be of a U-shaped groove structure.

In some embodiments, the depth of the first lead groove corresponding to the first phase is greater than the depth of the lead groove corresponding to the second phase, and the depth of the first lead groove corresponding to the second phase is greater than the depth of the first lead groove corresponding to the third phase.

In some embodiments, the above six winding group coils are connected by means of "Y" connection or delta connection.

In the example shown in FIGS. 1a to 1c, the six winding group coils are connected by means of Y-connection, and every two coils are connected in series by the lead 16 to form one phase line, one end of which is one end of one coil and the other end of which is the other end of the other coil. Then, one end of each of the three phase lines is connected by the wire clamping portion 15 to become a wiring end, and the other end of each phase line is used as the outgoing end of the phase line. In the example shown in FIGS. 1a to 1c, the other ends of the first winding group coil, the third winding group coil and the fifth winding group coil are used as the outgoing ends of the three phases to further obtain the three phases of the stator. The outgoing end of each phase line may be connected to the circuit board of the fan by the lead 13A.

In some embodiments, the insulating wire frames corresponding to the first winding group coil, the third winding group coil and the fifth winding group coil are all provided with third lead grooves, and the third lead grooves are configured to lead out the outgoing ends of all the phases. The outgoing end of each phase is connected to the circuit board of the fan by the lead 13A.

In some embodiments, the wiring ends are arranged outside the side of one insulating wire frame 1111 distal from the winding group coil.

In an embodiment, the six winding group coils are connected by means of delta connection.

In some embodiments, after the two ends of the six winding group coils are led out by the insulating wire frames 1111, the coils of the same phase are connected to obtain three phase lines, and six ends of the three phase lines are connected in sequence to obtain three outgoing ends of the three phases. That is, the tail end of a first phase line is connected to the head end of a second phase line, and the connection end point serves as one outgoing end of the three phases; the tail end of a second phase line is connected to the head end of a third phase line, and the connection end point serves as another outgoing end of the three phases; and the tail end of the third phase line is connected to the head end of the first phase line, and the connection end point serves as the last outgoing end of the three phases.

In some embodiments, the six ends of the three phase lines may be connected by the jumpers 16.

Figure 3:
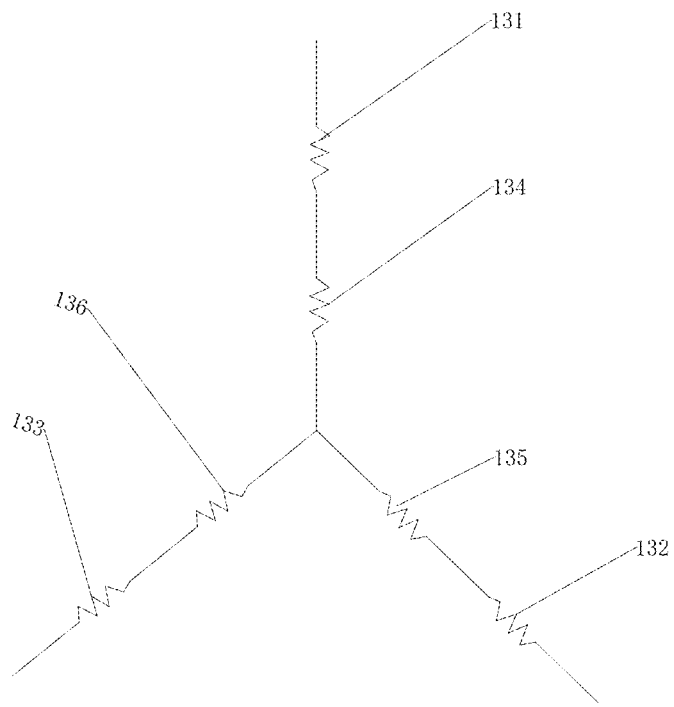
FIG. 3 is a schematic circuit diagram of a three-phase stator according to an embodiment of the present disclosure.

FIG. 3 is a circuit diagram of a three-phase stator according to an embodiment of the present disclosure.

As shown in FIG. 3, in this embodiment, the number of parallel branches of winding group coils of the same phase is 1, i.e., the tail end of one winding group coil of the same phase is connected to the head end of another winding group coil of the same phase so as to form one branch. That is, the winding group coils of the same phase are connected in series.

In the embodiment shown in FIG. 3, the six stator coils include: a first coil 131, a second coil 132, a third coil 133, a fourth coil 134, a fifth coil 135, and a sixth coil 136 which are arranged in the circumferential direction of the stator outer periphery clockwise or counterclockwise.

Here, the first coil and the fourth coil are set to be of a phase U, the second coil and the fifth coil to be of a phase V, and the third coil and the sixth coil to be of a phase W; two coils of the same phase form an angle of 180°; and two coils of the same phase are connected in series at an interval to form one branch.

Figure 4:
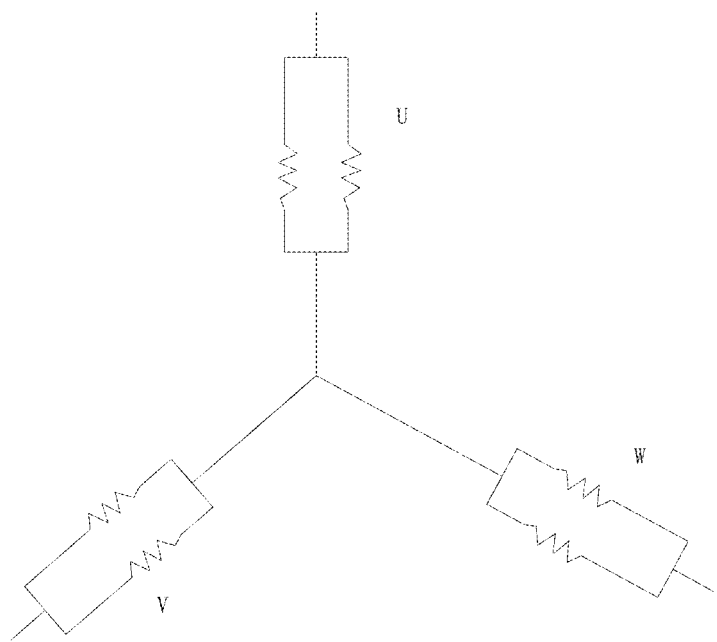
FIG. 4 is a schematic circuit diagram of a three-phase stator according to an embodiment of the present disclosure.

FIG. 4 is a circuit diagram of a three-phase stator according to an embodiment of the present disclosure.

As shown in FIG. 4, the number of parallel branches in the winding group coils of the same phase is 2. That is, the head end of one winding group coil of the same phase is connected to the head end of another winding group coil of the same phase, and the tail end of one winding group coil of the same phase is connected to the tail end of another winding group coil of the same phase to form two branches, i.e., the winding group coils of the same phase are connected in parallel.

In the embodiment shown in FIG. 4, the six stator coils include a first coil, a second coil, a third coil, a fourth coil, a fifth coil and a sixth coil which are arranged in the circumferential direction of the stator outer periphery 11 clockwise or counterclockwise. Here, the first coil and the fourth coil are set to be of a phase U, the second coil and the fifth coil to be of a phase V, and the third coil and the sixth coil to be of a phase W; and two coils of the same phase are connected in parallel at an interval to obtain two branches.

In an embodiment, a yoke of the stator is provided with a semi-circular hole 112 for positioning the axial diffuser of the fan, and the center of the semi-circular hole 112 is provided on the center line of the stator tooth.

Figure 5:
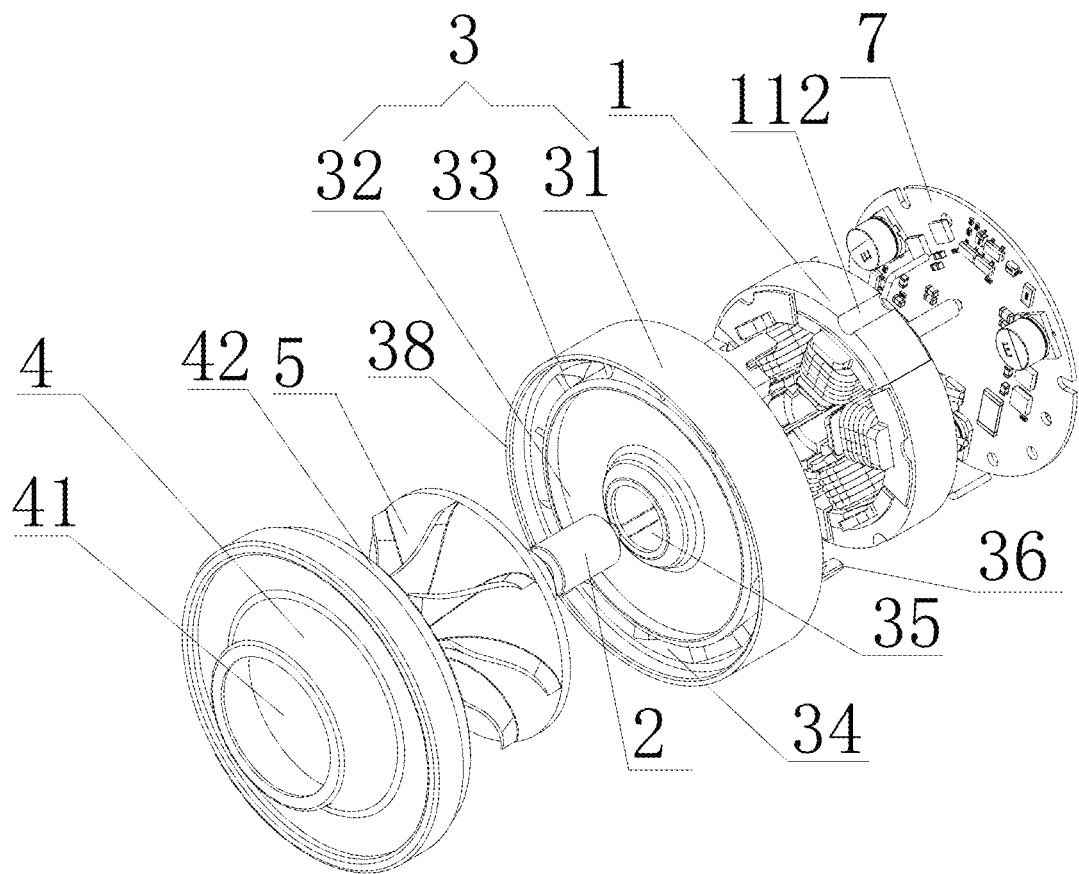
FIG. 5 is a schematic exploded diagram of a fan according to an embodiment of the present disclosure.
Figure 6:
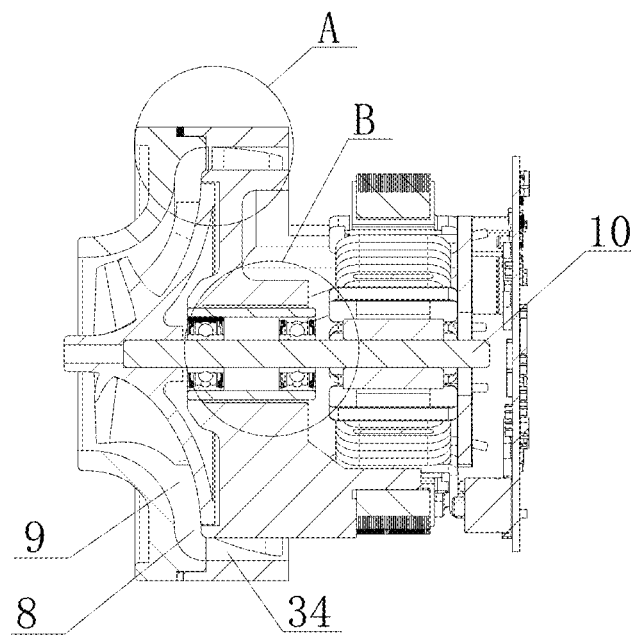
FIG. 6 is a schematic cross-section diagram of a fan according to an embodiment of the present disclosure.
Figure 7:
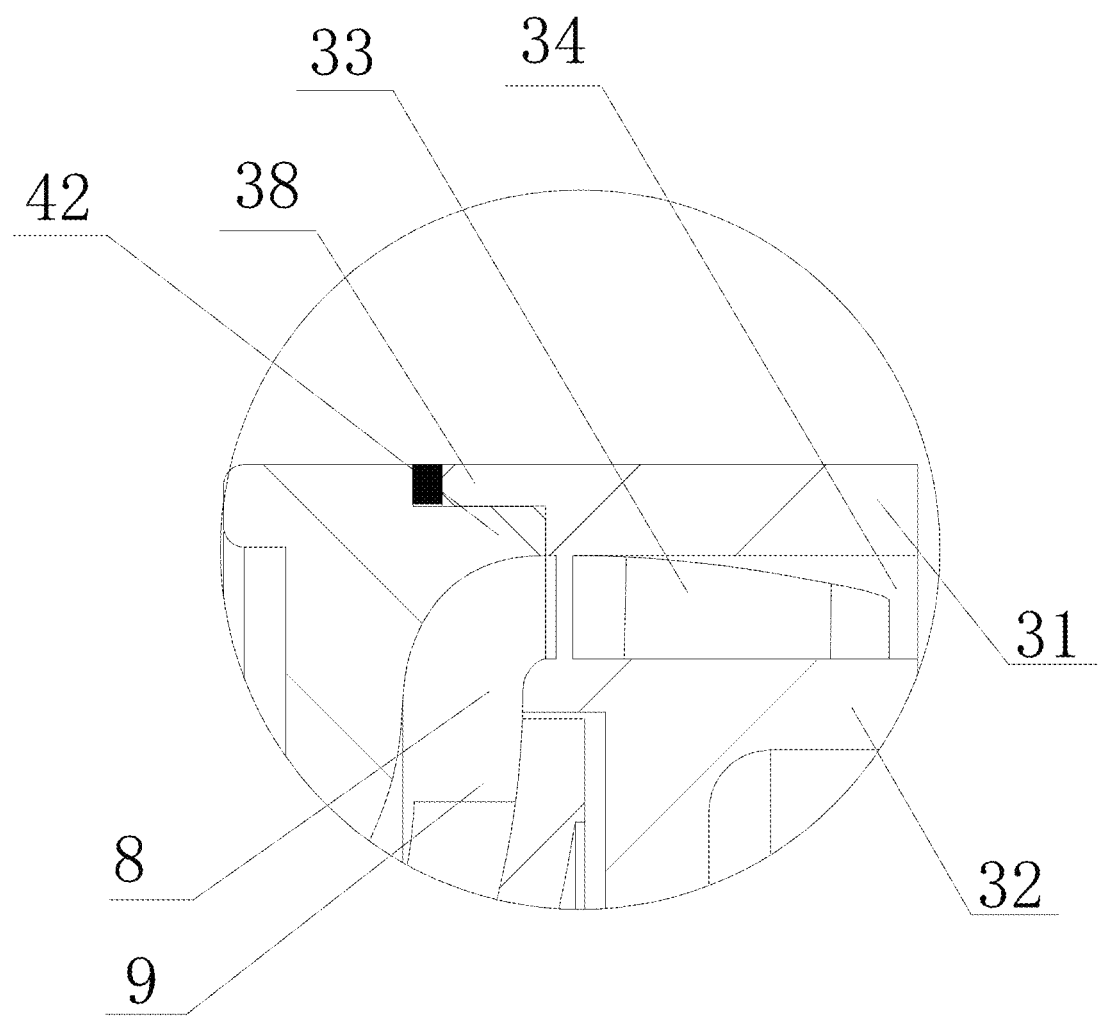
FIG. 7 is an enlarged view of part A in FIG. 6.
Figure 8:
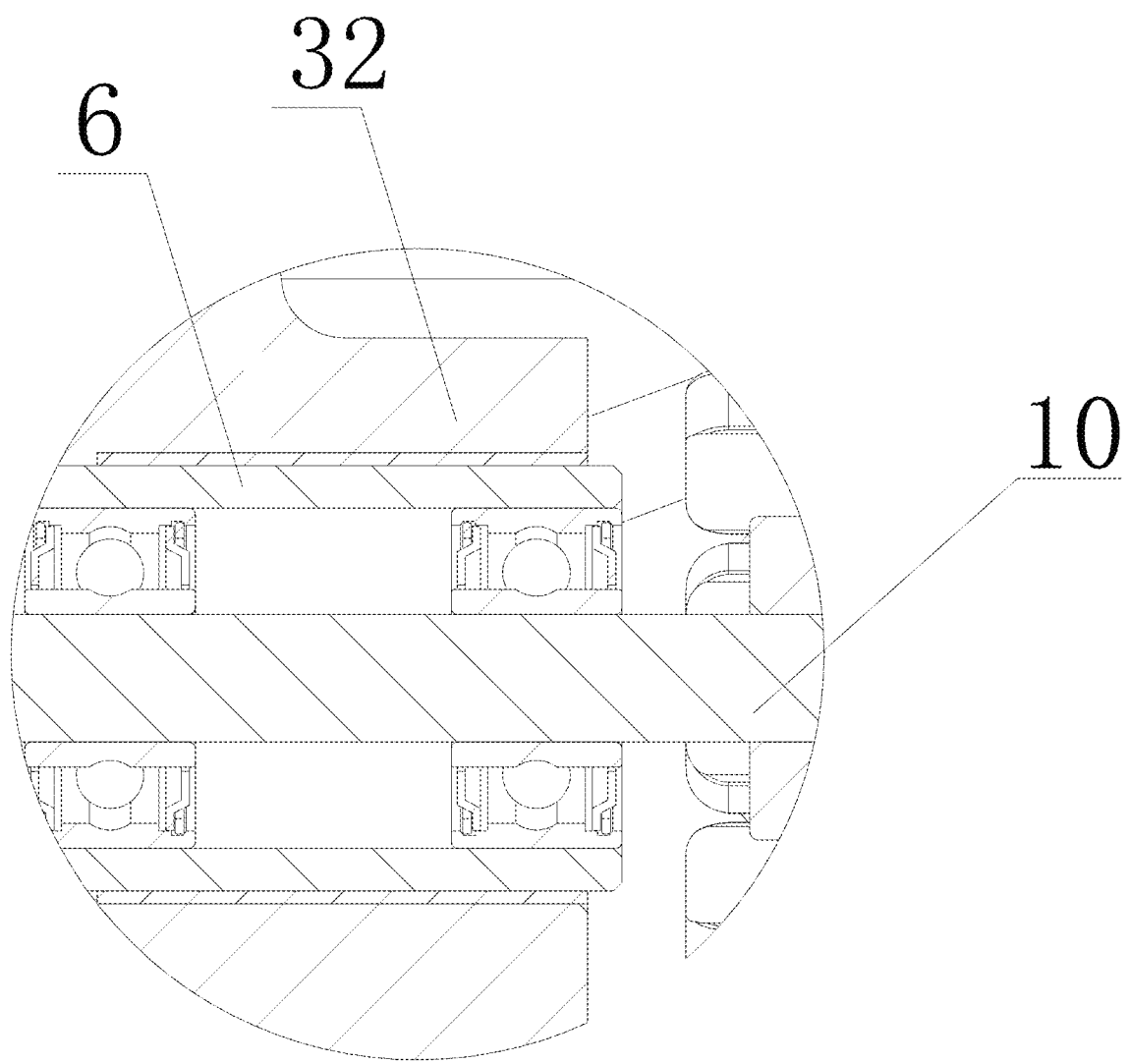
FIG. 8 is an enlarged view of part B in FIG. 6.
Figure 9:
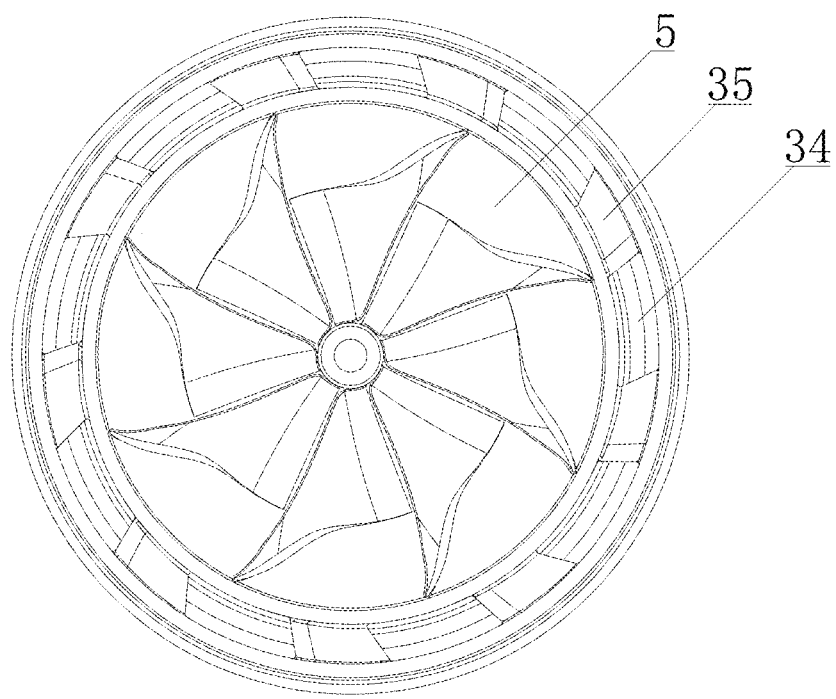
FIG. 9 is a schematic diagram of an end face for assembly of an impeller and a diffuser in a fan according to an embodiment of the present disclosure.
Figure 10:
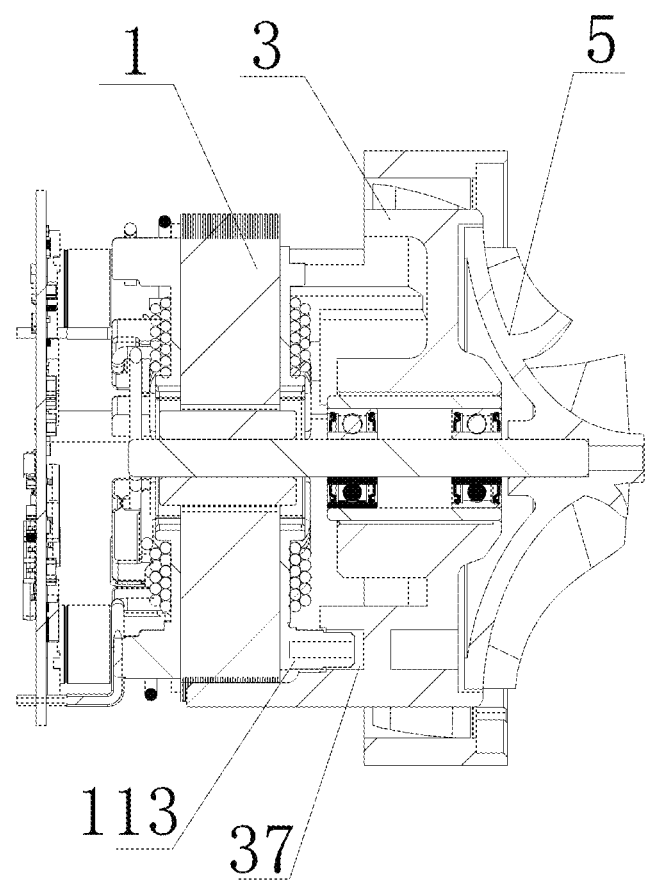
FIG. 10 is a schematic cross-section diagram of a fan according to another embodiment of the present disclosure.

FIG. 5 is a schematic exploded diagram of a fan according to an embodiment of the present disclosure.

As shown in FIG. 5, the fan includes the stator 1 provided by the foregoing embodiment and a rotor 2, and the rotor 2 is a permanent magnet having two poles.

In one embodiment, the fan further includes a circuit board 7, and an outgoing end of each phase of the stator is connected to the circuit board by a lead 13A.

In another embodiment, after the coils of the stator are connected by means of "Y" connection or delta connection, one outgoing end of each phase is connected to the circuit board 7 and connected to a power supply by the circuit board 7. For example, one outgoing end of each phase may be connected to the circuit board 7 by the lead 13A.

Referring to FIGS. 5 to 10, the fan further includes an axial diffuser 3, an air hood 4 and an impeller 5.

Here, the axial diffuser 3 is fixedly connected to the stator 1, and includes an outer cylinder 31, a main body 32 arranged in the outer cylinder 31, and diffuser vanes 33 connected to the outer cylinder 31 and the main body 32. The diffuser vanes 33 divide an annular space between the outer cylinder 31 and the main body 32 into a plurality of diffusion air passages 34, and the main body 32 is provided with a central shaft hole 35.

The air hood 4 is fixedly connected to the axial diffuser 3, and an impeller chamber 9 and an annular gridless channel 8 surrounding the impeller chamber 9 are formed between the air hood 4 and the axial diffuser 3. The impeller chamber 9 and the diffusion air passages are communicated by the annular gridless channel 8. The air hood 4 is provided with an air inlet.

The impeller 5 is arranged in the impeller chamber 9, and configured to introduce air from the air inlet 41; and driven by the impeller 5, air enters the diffusion air passages through the annular gridless channel 8, and flows out from the other ends of the diffusion air passages.

In the fan provided by the embodiment of the present disclosure, radial diffusion is removed, and the axial diffuser 3 is used. The chaotic airflow from the impeller 5 directly enters the axial diffuser 3 after passing through the annular gridless channel 8, and after being guided by the diffuser vanes 33 of the axial diffuser 3, the flow tends to be stable, thereby reducing generation of vortexes in the flow channel. Removal of radial diffusion can effectively reduce the wind resistance and energy loss, such that the working efficiency of the fan is improved. Increasing the "dynamic-static gap" can weaken a "dynamic-static interference" effect caused during operation of the fan, such that the noise of the fan is reduced.

A radial diffuser generally lies in that axial diffusion vanes are provided at the annular gridless channel 8 according to the present disclosure to form a radial air passage that is in most cases very close to the vanes. After flowing out of the impeller 5, air directly hits the front edges of the radial diffuser vanes 33, resulting in strong "dynamic-static interference". It is proved by a large number of documents that the "dynamic-static interference" generated by the rotor 2 and the vanes of the stator 1 is a main factor causing noise of the fan. In the fan provided by the embodiment of the present disclosure, a radial diffuser is replaced with the axial diffuser 3 to increase the "dynamic-static gap", which is a very powerful means to reduce noise of the fan.

Due to removal of the radial diffuser, the diameter of the fan can be reduced accordingly, which solves the problems such as the shortened service life of a bearing 6 and the increased noise of the fan caused by the fact that the power has to be increased due to the increase of the diameter of the fan.

In some embodiments, the external diameter of the main body 32 of the axial diffuser 3 equals the external diameter of the stator 1, such that air flowing out of the diffusion air passages 34 flows through the outside of the stator 1. In an embodiment of the present disclosure, the external diameter of the main body 32 of the axial diffuser 3 equals the external diameter of the stator 1, such that a fluid can flow out from the axial diffuser 3 through the outer periphery of the stator 1 without obstacles. Since air flows through the outside of the stator 1, the wind resistance is reduced and the fluid efficiency is improved.

In an embodiment of the present disclosure, the external diameter of the main body 32 of the axial diffuser 3 and the external diameter of the stator 1 are equal, but not absolutely equal, allowing a certain difference. For example, the difference therebetween is 1%, 3%, 5%, 7%, 10%, etc.

In some embodiments, one of the axial diffuser 3 and the stator 1 includes a plurality of positioning posts 36, and the other of the axial diffuser 3 and the stator 1 includes a plurality of semi-circular holes 112 adapted to the positioning posts 36. The axial diffuser 3 and the stator 1 can be conveniently connected and fixed by correspondingly providing the positioning posts 36 and the semi-circular holes 112 on the axial diffuser 3 and the stator 1 respectively.

The positioning posts 36 may be provided on any one of the axial diffuser 3 and the stator 1, and the semi-circular holes 112 are formed in the other thereof. For example, the positioning posts 36 may be provided on the axial diffuser 3, and the semi-circular holes 112 may be formed in the stator 1.

In some embodiments, the positioning posts 36 extend in the axial direction of the axial diffuser 3. In an exemplary embodiment, part of the diffuser vanes 33 of the axial diffuser 3 extend in the axial direction of the axial diffuser 3 to form the positioning posts 36, and the stator 1 includes the semi-circular holes 112. The number of the positioning posts 36 is not the same as the number of the diffuser vanes 33. Generally, the number of the positioning posts 36 may be smaller than the number of the diffuser vanes 33. Therefore, when the positioning posts 36 are arranged on the axial diffuser 3, part of the diffuser vanes 33 may extend in the axial direction to form the positioning posts 36. For example, three of the twelve diffuser vanes 33 extend in the axial direction to form the positioning posts 36. In an embodiment of the present disclosure, the diffuser vanes 33 extend in the axial direction of the axial diffuser 3 to form the positioning posts 36, such that the positioning posts 36 can have sufficient strength without adversely affecting the structure of the axial diffuser 3, and meanwhile, the consumption of materials can be reduced. Thus, in order to improve the strength of the positioning posts, there is no need to increase the thicknesses of the parts where the positioning posts 36 are located.

In an exemplary embodiment, the end portions of the diffuser vanes 33 may integrally extend in the axial direction of the axial diffuser 3 to form the positioning posts 36. Alternatively, part of the end portions of the diffuser vanes 33 may extend in the axial direction of the axial diffuser 3 to form the positioning posts 36. When part of the end portions of the diffuser vanes 33 extend in the axial direction of the axial diffuser 3 to form the positioning posts 36, for example, the sides of the diffuser vanes 33 close to the main body 32 may extend in the axial direction of the axial diffuser 3 to form the positioning posts 36.

In some embodiments, the positioning posts 36 may be formed on the main body 32. In an exemplary embodiment, the positioning posts 36 may be located at the positions of the main body 32 corresponding to the diffuser vanes 33.

In some embodiments, one positioning post may be partially formed on the main body 32 and partially formed by extension of the diffuser vanes 33.

In an embodiment of the present disclosure, the semi-circular holes 112 may be hole grooves or open grooves. In some embodiments, the outer peripheral surface of the stator 1 is recessed to form the semi-circular hole 112. The semi-circular hole 112 formed by recessing the outer peripheral surface of the semi-circular hole is the open groove, which can not only ensure stable positioning, but also saves materials while guaranteeing the strength. The wall surface of the semi-circular hole 112 is a cylindrical surface, and the positioning post 36 is provided with a cylindrical surface adapted to the wall surface of the semi-circular hole 112. The wall surface of the semi-circular hole 112 and the correspondingly adapted surface of the positioning post 36 are cylindrical, which effectively ensures the stability in their combination.

In some embodiments, the positioning post 36 is semi-cylindrical. One side of the positioning post 36 is provided with a cylindrical surface adapted to the wall surface of the semi-circular hole 112, and the other side thereof is matched with the peripheral surface of the stator 1.

In an embodiment of the present disclosure, the semi-circular hole 112 may be provided at any position on the peripheral surface of the stator 1. In some embodiments, the semi-circular hole 112 is located on the outer peripheral surface corresponding to the tooth centerline of the stator 1. The semi-circular holes 112 are provided on the outer peripheral surface opposite to teeth of the stator 1. There is enough space for the semi-circular hole 112 in this part, and the strength is ensured without additionally increasing the dimensions such as the thickness of the part where the semi-circular hole 112 is located, such that the consumption of materials is reduced.

In an embodiment of the present disclosure, the number of the semi-circular holes 112 or the number of the positioning posts 36 is not specifically limited, for example, they may be two, three, four, etc. In some embodiments, there are three semi-circular holes 112 and three positioning posts 36, which are uniformly distributed on their respective circumferences. There are three semi-circular holes 112 and three positioning posts 36, which can ensure the positioning connection between the axial diffuser 3 and the stator 1. A plurality of semi-circular holes 51 is distributed on one circumference, a plurality of positioning posts 36 is also uniformly distributed on one circumference, and the two circumferences have the same diameter. Since the semi-circular holes 112 and the positioning posts 36 are uniformly distributed on their respective circumferences, when the axial diffuser 3 and the stator 1 are connected, it is unnecessary to limit them in specific orientations. Any one of the positioning posts 36 may be adapted to any one of the semi-circular holes 112.

In an embodiment of the present disclosure, the fixed connection mode between the axial diffuser 3 and the stator 1 is not limited. For example, the axial diffuser 3 and the stator 1 may be glued, or connected by interference fit, or connected by a screw, etc.

In some embodiments, the axial diffuser 3 is provided with one or more connecting posts 113, and the stator 1 is provided with one or more connecting holes 37 adapted to the connecting posts 113. Alternatively, the axial diffuser 3 is provided with one or more connecting holes, and the stator 1 is provided with one or more connecting posts adapted to the connecting holes. According to the present disclosure, by taking that the stator is provided with the connecting posts 113 as an example, the axial diffuser 3 and the stator 1 are connected together by matching the connecting holes 37 to the connection posts 113. For example, the connecting posts 113 and the hole walls of the connecting holes 37 are fixedly connected by glue. In this way, glue may be applied in a specific position to avoid defects such as glue overflow. Alternatively, the connecting posts 113 and the connecting holes 37 are fixedly connected by interference fit.

In an exemplary embodiment, the axial diffuser 3 includes a plurality of connecting holes 37, and the stator 1 includes a plurality of connecting posts 113 adapted to the connecting holes 37. For example, a plurality of connecting holes 37 may be formed in the main body 32.

In the fan provided by the embodiment of the present disclosure, the connecting posts 113 and the connecting holes 37 corresponding to each other as well as the positioning posts 36 and the semi-circular holes 112 corresponding to each other may be included at the same time.

In some embodiments, the axis of the circle where the connecting posts 113 and the connecting holes 37 corresponding to each other are located is collinear with the axis of the circle where the positioning posts 36 and the semi-circular holes 112 corresponding to each other are located. In an exemplary embodiment, the radius of the circle where the connecting posts 113 and the connecting holes 37 corresponding to each other are located may be smaller than the radius of the circle where the positioning posts 36 and the semi-circular holes 112 corresponding to each other are located.

In some embodiments, the lengths of the connecting posts 113 are smaller than the lengths of the positioning posts 36. During assembly, the positioning of the axial diffuser 3 and the stator 1 may be achieved by adapting the positioning posts 36 for the semi-circular holes 112, such that the connecting posts 53 correspond to the connecting holes 37 to facilitate assembly.

In some embodiments, the end face of the outer cylinder 31 close to the air hood 4 is provided with a first annular protrusion, such that the end face of the outer cylinder 31 forms a first stepped surface; and one side of the outer wall surface of the outer cylinder 31 extends axially to form the annular protrusion. The air hood 4 is provided with a second annular protrusion 22, such that the end face of the air hood 4 connected to the outer cylinder 31 forms a second stepped surface; and the second stepped surface is adapted to the first stepped surface. The stepped surface is provided at the part where the outer cylinder 31 is connected to the air hood 4, such that the inner wall surface of the part where the air hood 4 is connected to the outer cylinder 31 is in smoother transition, which reduces interference to the fluid.

In some embodiments, the impeller 5 is provided with an odd number of vanes. For example, the number of vanes of the impeller 5 is three, five, seven, nine, eleven, etc. Since the impeller 5 is provided with an odd number of vanes, asymmetrical injection residual stress and resonance can be reduced.

In some embodiments, the number of vanes of the impeller 5 and the number of the diffuser vanes 33 are not multiples of each other. The number of the diffuser vanes 33 is selected not to be exactly divided by the number of vanes of the impeller 5, such that air noise can be reduced. For example, the number of vanes of the impeller 5 is seven, and the number of the diffuser vanes 33 is twelve.

In some embodiments, the number of the diffuser vanes 33 is a multiple of three. The number of the diffuser vanes 33 is a multiple of three to facilitate arrangement of the positioning posts 36. Three positioning posts 36 may ensure positioning of the axial diffuser 3 and the stator 1. The positioning posts 36 are uniformly distributed on the circumference, facilitating assembly of the axial diffuser 3 and the stator 1. When the positioning posts 36 are formed by extension of the diffuser vanes 33, the number of the diffuser vanes 33 being a multiple of three may ensure uniform distribution of the positioning posts 36. For example, the number of the diffuser vanes 33 may be nine, twelve, fifteen, or the like. Certainly, in the embodiment of the present disclosure, it is not excluded that the number of the diffuser vanes 33 is a number other than a multiple of three.

In some embodiments, the number of vanes of the impeller 5 is smaller than the number of the diffuser vanes 33. The number of the diffuser vanes 33 meets the rectification efficiency while the vanes of the impeller 5 meet the suction efficiency, In some embodiments, the diffuser vanes 33 may be inclined, i.e., the axes of the diffuser vanes 33 are not parallel to the axis of the axial diffuser 3. The axis of the diffusion air passage 34 is not parallel to the axis of the axial diffuser 3, either. In an exemplary embodiment, the axis of the diffusion air passage 34 and the axis of the axial diffuser 3 may form an angle of 10° to 45°.

In an embodiment of the present disclosure, the axial diffuser 3 is assembled on a motor shaft 10 by a bearing 4, and the impeller 5 is fixed on a motor.

The fan provided by the embodiment of the present disclosure further includes a rotor 2 and a circuit board 7. The rotor 2 is fixed on the motor shaft 10. The circuit board 7 is connected to the stator 1.

A cleaning device is provided according to an embodiment of the present disclosure. The cleaning device includes the fan as described in any one of the foregoing embodiments.

In the fan of the cleaning device provided by the embodiment of the present disclosure, radial diffusion is removed, and the axial diffuser 3 is used. The chaotic airflow from the impeller 5 directly enters the axial diffuser 3 after passing through the annular gridless channel 8, and after being guided by the diffuser vanes 33 of the axial diffuser 3, the flow tends to be stable, thereby reducing generation of vortexes in the flow channel. Removal of radial diffusion can effectively reduce the wind resistance and energy loss, such that the working efficiency of the fan is improved. Increasing the "dynamic-static gap" can weaken a "dynamic-static interference" effect cause during operation of the cleaning device, such that the noise of the fan is reduced.

The radial diffuser is generally provided at the annular gridless channel 8, which is in most cases very close to the vanes. After flowing out of the impeller 5, air directly hits the front edges of the radial diffuser vanes 33, resulting in strong "dynamic-static interference". It is proved by a large number of documents that the "dynamic-static interference" generated by the rotor 2 and the vanes of the stator 1 is a main factor causing noise of the fan. In the fan of the cleaning device provided by the embodiment of the present disclosure, a radial diffuser is replaced with the axial diffuser 3 to increase the "dynamic-static gap", which is a very powerful means to reduce noise of the fan.

Due to removal of the radial diffuser, the diameter of the fan can be reduced accordingly, which solves the problems such as the shortened service life of a bearing 6 and the increased noise of the fan caused by the fact that the power has to be increased due to the increase of the diameter of the fan.

According to another aspect of the present disclosure, a cleaning device is provided. The cleaning device is provided with the fan as defined in any one of the above technical solutions. The cleaning device provided by the present embodiment includes a floor mopping robot, a hand-held vacuum cleaner, etc.

It should be understood that the specific embodiments of the present disclosure are only used to illustrate or explain the principles of the present disclosure, and should not constitute any limitation to the present disclosure. Therefore, any modifications, equivalent substitutions, improvements, etc. made without departing from the spirit and scope of the present disclosure should be included within the protection scope of the present disclosure. Furthermore, the appended claims of the present disclosure are intended to cover all changes and modifications that fall within the scopes and boundaries of the appended claims, or equivalents of such scopes and boundaries.

What is claimed is:

1. A stator, comprising:
an annular stator outer periphery, wherein
a plurality of stator teeth distributed uniformly is connected to an inner side of the stator outer periphery in a circumferential direction;
the stator teeth are provided along a radial direction of the stator outer periphery; a winding group coil is wound outside each of the stator teeth;
each winding group coil is correspondingly provided with an insulating wire frame, and each of the insulating wire frames is provided along an axial direction of the stator outer periphery;
the insulating wire frame is provided with a first lead groove, and the first lead groove is configured to lead out one end of the winding group coil to enable the end of the winding group coil to be connected to the winding group coil of the same phase around the outside of the stator outer periphery in the circumferential direction; and
depths of the first lead grooves of the insulating wire frames corresponding to the winding group coils of the same phase are the same, and depths of the first lead grooves of the insulating wire frames corresponding to the winding group coils of different phases are different from each other,
wherein the stator outer periphery is surrounded by a plurality of ring-sector-shaped stator units that are chain-connected; each of the stator units is connected to the stator teeth; and
each of the insulating wire frames is arranged on the stator unit.

2. The stator according to claim 1, wherein
the stator outer periphery is formed by connecting the stator unit in a first place to the stator unit in a last place and welding connection wires of all adjacent stator units, after forming the winding group coil upon winding the stator teeth, leading out one end of the winding group coil by the insulating wire frame, extending around the outside of the stator outer periphery in the circumferential direction and connecting with the winding group coil of the same phase.

3. The stator according to claim 1, wherein
an end of the stator teeth away from the stator outer periphery is recessed to form a circular arc structure;
a circle surrounded by the circular arc structure of the stator teeth is configured to accommodate a rotor having two poles;
the number of the stator teeth is six; and
the stator is of three phases.

4. The stator according to claim 3, wherein
the stator outer periphery sequentially comprises a first winding group coil, a second winding group coil, a third winding group coil, a fourth winding group coil, a fifth winding group coil and a sixth winding group coil that are sequentially arranged in a circumferential direction;
wherein a first end of the first winding group coil is connected to one end of the fourth winding group coil to form a first phase of the stator, a first end of the second winding group coil is connected to one end of the fifth winding group coil to form a second phase of the stator, and a first end of the third winding group coil is connected to one end of the sixth winding group coil to form a third phase of the stator, such that an angle between two of the winding group coils of the same phase is 180°.

5. The stator according to claim 4, further comprising a wire clamping portion, wherein
the wire clamping portion is arranged on a side of a sixth insulating wire frame corresponding to the sixth winding group coil away from the stator teeth; and
the sixth insulating wire frame comprises a second lead groove, and the second lead groove is configured to lead an outgoing end of each phase to the wire clamping portion to be clamped by the wire clamping portion.

6. The stator according to claim 5, wherein each of the insulating wire frames corresponding to the first winding group coil, the third winding group coil and the fifth winding group coil is provided with a third lead groove, and the third lead groove is configured to lead an outgoing end of each phase; and the outgoing end of each phase is connected to a circuit board by a lead.

7. The stator according to claim 4, wherein each of the insulating wire frames corresponding to the first winding group coil, the third winding group coil and the fifth winding group coil is provided with a third lead groove, and the third lead groove is configured to lead an outgoing end of each phase; and the outgoing end of each phase is connected to a circuit board by a lead.

8. The stator according to claim 3, wherein the six winding group coils are connected by means of Y connection or delta connection to form three phases of the stator.

9. The stator according to claim 1, wherein
the number of branches of the winding group coils of the same phase is 1.

10. The stator according to claim 1, wherein
the number of parallel branches in the winding group coils of the same phase is 2.

11. The stator according to claim 1, wherein
a yoke of the stator is provided with a semi-circular hole for positioning an axial diffuser of a fan; and
the semi-circular hole is provided on a center line of the stator teeth.

12. The stator according to claim 11, wherein a connecting post matched with a connecting hole of the axial diffuser is arranged on a side of the stator outer periphery close to the axial diffuser, and the connecting post is configured to assemble the axial diffuser.

13. The fan according to claim 12, further comprising:
an axial diffuser fixedly connected to the stator, wherein the axial diffuser comprises an outer cylinder, a main body arranged in the outer cylinder, and diffuser vanes connected to the outer cylinder and the main body; the diffuser vanes divide an annular space between the outer cylinder and the main body into a plurality of diffusion air passages; and the main body is provided with a central shaft hole;
an air hood fixedly connected to the axial diffuser, wherein an impeller chamber and an annular gridless channel surrounding the impeller chamber are formed between the air hood and the axial diffuser; the impeller chamber and the diffusion air passage are communicated by the annular gridless channel; and the air hood is provided with an air inlet; and
an impeller arranged in the impeller chamber, wherein the impeller is configured to introduce air from the air inlet;

the air enters the diffusion air passage through the annular gridless channel under driven by the impeller, and flows out from the other end of the diffusion air passage.

14. A cleaning device, comprising the fan as defined in claim 12.

15. A fan, comprising a rotor and the stator as defined in claim 1, wherein the rotor is a permanent magnet having two poles.

16. The fan according to claim 15, further comprising a circuit board, wherein an outgoing end of each phase of the stator is connected to the circuit board by a lead.

* * * * *